Nov. 17, 1942.　　A. G. KANDOIAN　　2,302,102
FOUR COURSE RADIO BEACON
Filed Feb. 1, 1940　　3 Sheets-Sheet 1

INVENTOR.
ARMIG G. KANDOIAN
BY R. C. Hopgood
ATTORNEY.

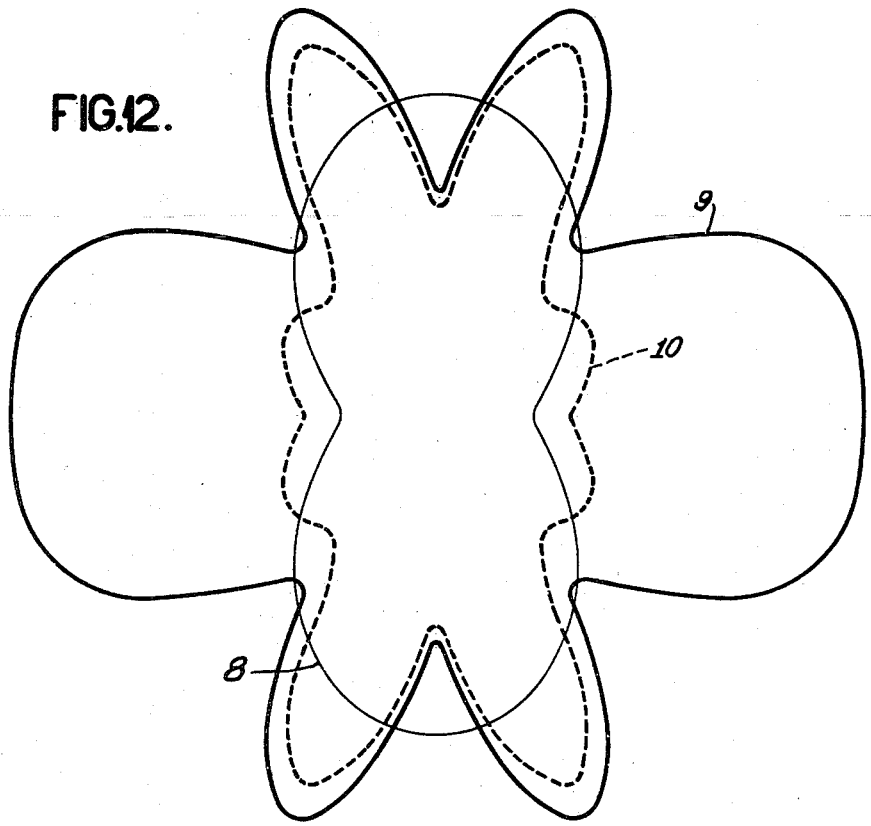
FIG.12.
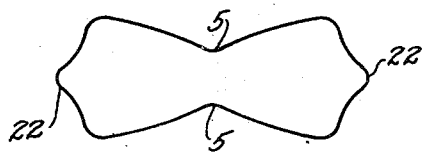
FIG.9.
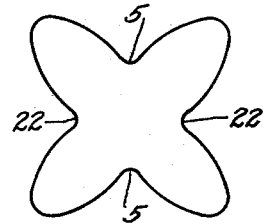
FIG.10.
FIG.13.
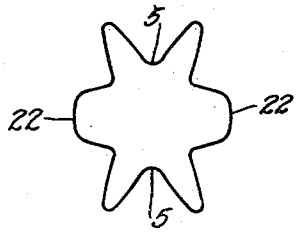
FIG.11.
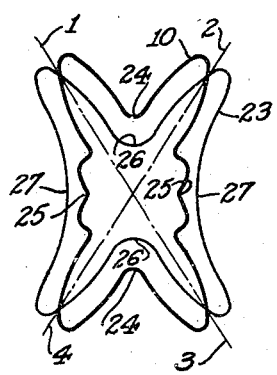

Nov. 17, 1942.  A. G. KANDOIAN  2,302,102
FOUR COURSE RADIO BEACON
Filed Feb. 1, 1940   3 Sheets-Sheet 3
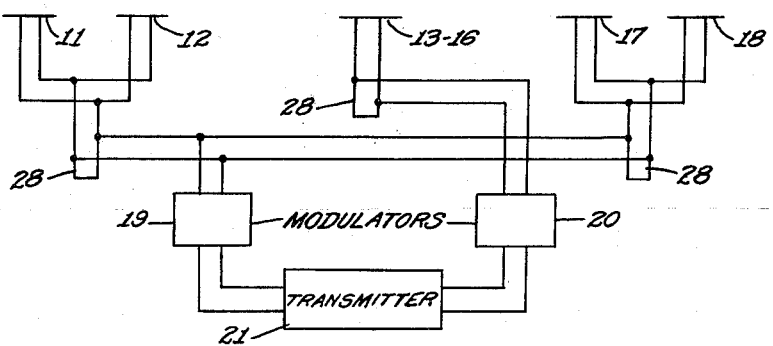
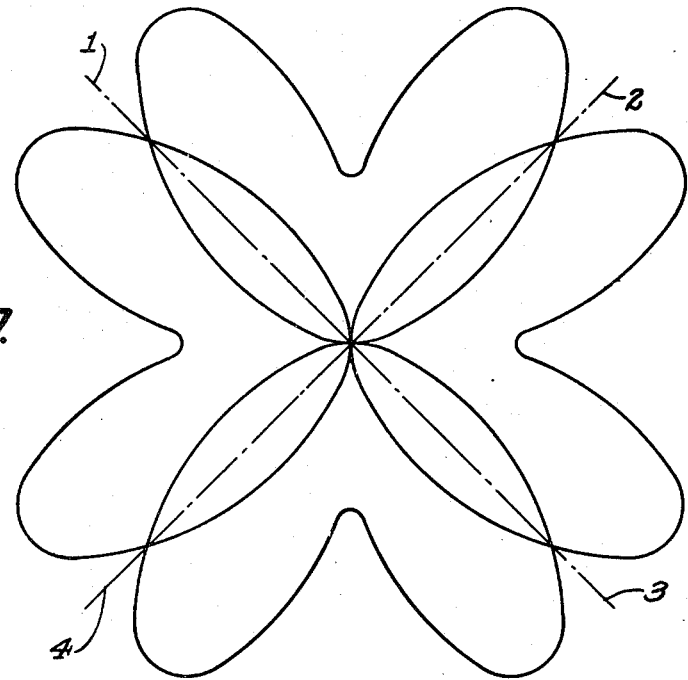
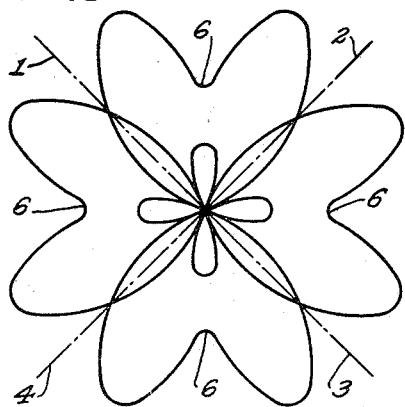
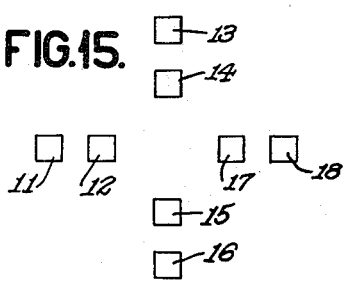
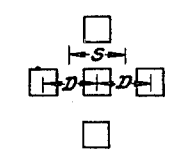
INVENTOR.
*ARMIG G. KANDOIAN*
BY
ATTORNEY.

Patented Nov. 17, 1942

2,302,102

UNITED STATES PATENT OFFICE 2,302,102

FOUR COURSE RADIO BEACON

Armig G. Kandoian, New York, N. Y., assignor to International Telephone & Radio Manufacturing Corporation, a corporation of Delaware Application February 1, 1940, Serial No. 316,728

8 Claims. (Cl. 250—11)

This invention relates to radio beacons and more specifically to an improved type of four-course radio beacon.

Four-course radio beacons of both the horizontally and vertically polarized type made up of two intersecting and mutually perpendicular figures-of-8 are known. Beacons formed by these patterns have well known objections, namely, the courses are broad, a great deal of radiation takes place intermediate adjacent courses where it is least needed and most likely to cause interfering reflections, and when the courses are sharpened slightly, the signals along the course become very low. In accordance with my invention I provide a four-course beacon which overcomes these objections by forming the courses with two multiple lobe patterns which are, in turn, formed by two dumb-bell shaped patterns. Throughout the specification the term "dumb-bell pattern" is interpreted as an elongated pattern being generally narrower at the center than at each end.

An object of my invention is to provide a four-course beacon having an improved degree of sharpness.

A further object of my invention is to reduce the amount of radiation between adjacent courses.

A further object of my invention is to increase the on-course signal strength, thus minimizing the effects of re-radiated stray signals.

Other objects of my invention will appear in the description associated with the attached drawings wherein:

Figs. 7 through 12 are diagrams used in explaining my invention;

Figs. 13 through 18 are further embodiments of my invention.

Figure 1:
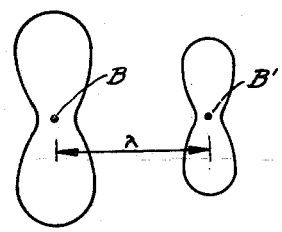
Figs. 1 and 2 are radiation patterns that may be used in forming the four-course beacon of my invention.

Suppose two radiating sources B and B', as shown in Fig. 1, are spaced one wave length apart and energized 180° out of phase. If the radiation pattern of these sources are of elongated form, for example in the shape of dumb-bells and the power radiated from B is greater than that from B', the resultant field pattern observed at a comparatively great distance therefrom with respect to the wave length will be similar to that of Fig. 2. The elongated or dumb-bell patterns may be obtained from two spaced radiators, for example, as is well known in the art. The ratio of the power in radiator B to the radiator B' is assumed, for example, to be 10 to 8, but in practicing my invention the ratio need not be restricted to this value, and it is also possible to make the power supplied to the radiator B' larger than the power supplied to the radiator B.

Figure 2:
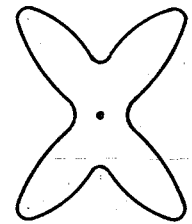

The radiation pattern of Fig. 2 is an example of the pattern that can be produced by the combination of the patterns of Fig. 1. The central dot indicates the center of radiation of the pattern corresponding substantially to the location of the two radiating sources B, B'. The shape of this pattern is determined by the phasing of radiators B and B', the shape of the field pattern associated with radiators B and B', the spacing of the radiators, and the relative strengths of the patterns. This is evident when the space phase relation is taken into account in the different directions, neglecting the attenuation due to the relatively small antenna spacing. This difference in power due to attenuation is negligible for all practical purposes since the radiation strength in a horizontal direction is substantially proportional to the square of the distance from the radiating source. While I have shown in Fig. 2 four minimums and four lobes of a particular shape, the number of lobes or minima and the shape thereof may be adjusted by any of the above factors, depending upon the desired resultant radiation pattern. The method of determining the shape of the resultant pattern will be outlined in the later description.

If the dumb-bell patterns of Fig. 1 are obtained by ordinary closed loops energized by unequal currents, care must be taken to properly direct the loops with respect to the phase relation of energization. Since the fields on each side of the closed loops are inherently 180° out of phase, the resultant in phase fields of each loop must point or be positioned in opposite direction. With this precaution the pattern of Fig. 2 is obtained in a manner similar to that outlined above.

Instead of energizing the radiating sources B and B' 180° out of phase, the dumb-bell patterns of Fig. 1 may have their axes rotated through 90° and their centers displaced one-half wave length or odd multiple thereof apart, and patterns similar to that of Fig. 2 will be obtained by energizing the sources in phase. It is also possible to locate the major axis of one dumb-bell pattern at right angles with respect to the major axis of the other dumb-bell pattern and so adjust the relative currents, spacings, and phasings as taught by my invention that a similar resultant pattern is obtained.

Figure 3:
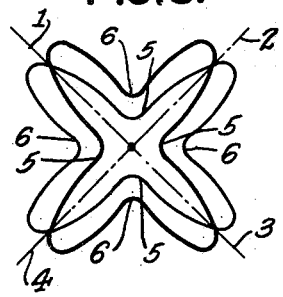
Fig. 3 is an embodiment of my invention.

If two resultant patterns like those of Fig. 2 are combined, as in Fig. 3, with their axes at right angles to each other the dot at the center of the patterns indicating the center of radiation of the systems, four equi-signal sources, 1 through 4, will be formed. These courses have a sharpness that exceeds that of courses formed by ordinary figure-of-8 patterns being on the order of two decibels or more per degree and a half departure from course. Due to the fact that the patterns forming the courses intersect near their lobes of maximum radiation, the signal strength along the courses is greater. The minima 6 in this particular pattern occur halfway between the courses where there is no demand for radiation. Since the energy is mainly directed along the courses, there is less possibility for interference due to reflections. If it is desired to restrict the number of courses to four, the minima 5 must be smaller than or equal to the magnitude of the minima 6.

In the preferred embodiment of my invention, loops of the type shown by Andrew Alford in application No. 270,173, filed April 26, 1939, are employed. These loops are spaced at predetermined distances to give a desired dumb-bell field pattern. These loops may, however, be replaced by other antennas such as dipoles.

Figure 4:
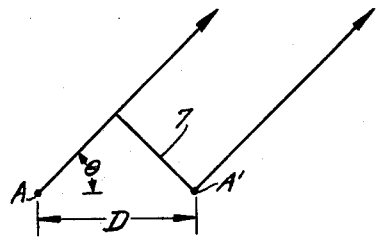
Fig. 4 is a diagram used in explaining the formation of radiation patterns utilized in my invention.

The radiation pattern formed by energy from the spaced antennas may be studied by considering two antennas A and A' arranged as in Fig. 4. Assume that we wish to consider the waves at an angle $\theta$ to the axes of the antennas and that the waves are combined along a plane represented by the line 7. The phase delay due to the spacing is evidently $$\phi = \frac{2\pi}{\lambda} D \cos \theta$$

If we assume unity power and energization in phase for each of the radiators A and A', the resultant energy at any point may be shown to be $$R = 2 \cos \left(\frac{\pi D}{\lambda} \cos \theta\right)$$

Figure 5:
Figs. 5 and 6 are radiation patterns that may be used in accordance with my invention.

When the powers supplied to the radiators A and A' are kept equal, the shape of the dumb-bell pattern varies with the spacing. The pattern of Fig. 5 is typical of the pattern formed when the spacing D is less than one-half wave length at the operating frequency. When D is equal to 0 the pattern is substantially a circle, and when D is equal to one-half wave length the pattern takes on the form of a figure-of-8.

Figure 6:
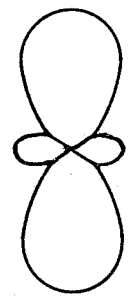

As the spacing D is increased above one-half wave length minor lobes begin to appear in the pattern as shown in Fig. 6. The size of the lobes increases as the spacing increases, but the size of the lobes is unimportant as long as the minima formed in the resultant pattern by the combination of the dumb-bell patterns are kept below the value explained in connection with the minima 5 of Fig. 3.

Figure 7:
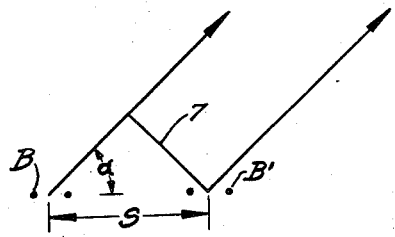

In Fig. 7 a diagram similar to that of Fig. 4 illustrates the combination of the two dumb-bell patterns into a multi-lobed resultant pattern according to my invention. The antennas A and A' of Fig. 4 are used as a single radiating source B (Fig. 7) and a similar pair of radiators with equal or unequal spacing are located at the radiating source B'.

Figure 8:
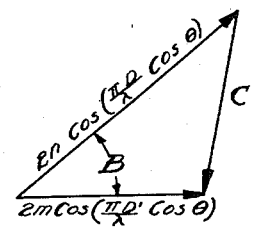

By the use of the vector diagram of Fig. 8 we can find the resultant energy at any point at an angle $\alpha$ with respect to the axis of the sources B and B'. Assume that the currents in the antennas of sources B and B' are $n$ and $m$, respectively and are 180° out of phase with one another. The currents are indicative of the powers at the sources, and by way of example the current in B will be assumed to be greater than the current in B'. The radiation from the sources B and B' may then be represented by $$B_r = 2n \cos \left(\frac{\pi D}{\lambda} \cos \theta\right)$$

and $$B'_r = -2m \cos \left(\frac{\pi D'}{\lambda} \cos \theta\right)$$

The phase delay along the plane of line 7 due to the spacing, in Fig. 7, is $$\phi' = \frac{2\pi S}{\lambda} \cos \alpha = \beta$$

and the resultant energy at an angle $\alpha$ is therefore $$C^2 = \left[2m \cos\left(\frac{\pi D'}{\lambda} \cos \theta\right)\right]^2 + \left[-2n \cos\left(\frac{\pi D}{\lambda} \cos \theta\right)\right]^2 - 8mn \left[\cos \left(\frac{\pi D}{\lambda} \cos \theta\right)\right]^2 \cos \beta$$

$$C = 2n \sqrt{\frac{m^2}{n^2} \cos^2 \left(\frac{\pi D'}{\lambda} \cos \theta\right) + \cos^2 \left(\frac{\pi D}{\lambda} \cos \theta\right) + 2\frac{m}{n} \cos^2 \left(\frac{\pi D}{\lambda} \cos \theta\right) \cos \beta}$$

assuming any spacings D, D', and S, that is, S may be less than or greater than D or D' and D and D' are not necessarily equal. When S is less than D and D', adjacent radiators of the systems B, B' have opposite phase, and when S is greater than D and D', adjacent pairs of radiators have opposite phase. Hence by using this equation and knowing the desired radiation pattern a set of values for D, D', S, $m$ and $n$ may be computed.

In the preferred case, however, D=D' and the equation for the resultant energy simplifies to $$C = 2n \cos \left(\frac{\pi D}{\lambda} \cos \theta\right) \sqrt{1 + \left(\frac{m}{n}\right)^2 + \frac{2m}{n} \cos \beta}$$

By inspection it may be seen that the equation for the resultant field pattern consists of two factors, a factor corresponding to the equation for the shape of a dumb-bell or individual field pattern and a square root factor. Dumb-bell shaped field patterns and their equations have been analyzed in connection with Figs. 4 through 6. By assuming various values for the terms under the square root sign and solving the square root patterns similar to those of Figs. 9, 10 and 11 may be obtained, and by further analyzing the square root factor, it is apparent that the minima 5 of the pattern shown in Figs. 10 through 12 are determined by the terms 1−$m/n$, and the maxima of lobes are determined in magnitude by the term 1+$m/n$, and hence the degree of contrast between the maximum and the minimum is determined by the ratio of the powers at the source B and B'. At the points 22 the value of cos α is 1 and hence the magnitudes of the values at 2 cannot be easily determined but depend upon the expression $$\sqrt{1 + \left(\frac{m}{n}\right)^2 + 2\frac{m}{n} \cos \frac{2\pi S}{\lambda}}$$

and may be equal to the magnitudes of the minima when $$S = \lambda, 2\lambda, 3\lambda \text{ etc.}$$

Fig. 9 illustrates the graph of the overall radiation obtained with the square root factor when the spacing S is between 0 and one-half wave length. When the spacing S is increased to between one-half wave length and 1 wave length, the pattern of Fig. 10 results, and when S is greater than one wave length, a multi-lobe pattern, similar to that of Fig. 11, results.

Fig. 12 illustrates a typical example of the combination of the dumb-bell factor and the square root factor. The dumb-bell 8 is of the type found when the spacing D between two antenna units is about $\frac{4}{10}$ of a wave length, or in the general case, less than one-half wave length. If we make the ratio of the currents $$\frac{m}{n}$$

equal to approximately one-half and the spacing S of the radiating sources equal to one and one-half wave lengths, then a curve 9 of the square root factor is obtained. Multiplying the two factors 8 and 9 together gives the resultant field pattern 10. Although another pattern similar to pattern 10 could be used in combination with this resultant pattern to form four courses at 45 degree angles with the right angularly related axes of the pattern, the courses would lose a considerable degree of their sharpness. This is evident from the fact that the minima of the resultant field pattern 10 occur at approximately 45 degrees and the slopes are comparatively flat. Therefore, in the preferred embodiment of my invention, spacings S are utilized that cause the minima to be at an angle less than 45 degrees with respect to the one axis of the pattern. Patterns similar to those of pattern 10 may, however, be used with patterns of other shapes to vary the angles or angle at which the courses intersect. For example, it is possible to use a pattern having its axis at right angles to the axis of pattern 10, and intersecting pattern 10, which has widely divergent lobes so as to intersect pattern 10 at points about 60 degrees from the horizontal axis. The four courses would then intersect each other at approximately a 60 degree angle. In some cases, courses intersecting at these angles are desirable and they may be easily formed by merely varying the spacing S of the radiating sources B and B', or by changing the angle of intersection of the two resultant patterns.

Fig. 13 illustrates another manner in which the resultant pattern 10 of Fig. 12 may be used to form a four-course beacon. In this figure a resultant pattern 23 having its major axis parallel to the major axis of the pattern 10 intersects with the pattern 10 and forms the four courses 1–4. These courses are distinguished by the fact that the axes of the patterns are parallel rather than at an angle as in the previous examples and are a further modification of my invention. With the axes parallel as shown it becomes necessary to align all eight radiating antennas, and if desired, the patterns may be adjusted as before to form courses at any predetermined angle. To restrict the number of courses to four the patterns have dissimilar minima since the minima 26 must not be greater than the minima 24 and the minima 25 must not be greater than the minima 27.

Figs. 14 and 15 illustrate one arrangement for obtaining the four-course beacon of my invention. In these figures, energy from the transmitter 21 is fed through modulators 19 and 20 which may modulate the energy with different frequencies or A and N keying. From the modulators the energy is fed to the horizontal loops 11—18 of the aforementioned Alford type. As shown, the physical length of the line between modulator 19 and the loops 17 and 18 is one-half wave length longer than the line from modulator 19 to the loops 11 and 12, but the relative phasing may be reversed, and if desired, a phase shifter may be employed instead of adjusting the physical length of the connecting lines. Sections 28 allow adjustment of the relative antenna currents. In a similar manner the loops 13 and 14 are phased one-half wave length with respect to the loops 15 and 16 and fed the correct relative currents.

Fig. 17 illustrates a further embodiment of my invention. When the spacing D of a pair of antennas A and A' is made equal to the spacing S of the radiating sources B and B', an antenna A' of one group becomes superposed on an antenna A of a second group. The number of antennas necessary, therefore, to produce a four-course beacon is reduced from eight to five since a center antenna may be used to perform the operations of each of the innermost antennas of a group of eight. The resulting antenna arrangement with the spacing S equal to the spacing D is shown in Fig. 16. When the spacing S is equal to the spacing D and is equal to one-half wave length at the operating frequency, and the ratio of the currents in the antennas is approximately 10 to 6, the four-course beacon and resultant field pattern of Fig. 16 result. The increase of the strength of on-course signals in a beacon of this type over the signal strength of a beacon formed by intersecting and mutually perpendicular figures of eight, is given by a ratio in the neighborhood of .76 to .707, and the sharpness of course has a ratio in the order of 0.9 decibels to 0.35 decibel per degree and a half.

Fig. 18 illustrates a four-course beacon obtained when the spacing S is equal to the spacing D and is equal to ⅝ of a wave length and the ratio of the current is about 10 to 6. The sharpness of the course in an arrangement of this type is again increased, giving a ratio of about 1.7 decibels to .35 decibel per degree and a half. It will be noticed in this figure, however, that minor lobes are beginning to appear, and if it is desired to restrict the number of courses to four, the spacing must not be increased so that the minor lobes will intersect with the minima 6. If more than four courses are desired, these minor lobes may be increased until they do intersect with the minima 6, and the number of courses will be increased accordingly.

Although in the above cases I have formed the resultant field patterns by the use of similarly shaped dumb-bell patterns, it is not necessary that they be exactly similar, but it is desirable to use dumb-bell patterns of substantially similar shape in preferred embodiments of my invention.

While I have described particular embodiments of my invention for purposes of illustration, it will be understood that various modifications and adaptations thereof may be made within the spirit of the invention as set forth in the appended claims.

What is claimed is:

1. A system for producing a radio beacon having a plurality of equi-signal courses comprising means to produce two overlapping radio frequency regions, each region having a plural lobe pattern with the lobes of each pattern intersecting the lobes of the other pattern to define said equisignal courses, each of said means which produces said regions including a radiating system producing a pair of plural lobed radio frequency fields with the major axes of the lobes of each field in substantial alignment and with the major axes of the pairs of fields substantially parallel but displaced so that said fields partially overlap.

2. A system for producing a radio beacon having a plurality of equi-signal courses comprising means for producing a first region of radio frequency energy in the shape of a pattern having a plurality of lobes comprising means for producing a first field of radio frequency energy in the shape of a dumb-bell and means for producing a second field of radio frequency energy in the shape of a dumb-bell similarly aligned with and overlapping said first dumb-bell and displaced with respect thereto the major axes of said dumb-bell shaped fields being substantially linear and parallel, and means for producing a second region of radio frequency energy in the shape of a pattern having a plurality of lobes, comprising means for producing a third field of radio frequency energy in the shape of a dumb-bell and means for producing a fourth field of radio frequency energy in the shape of a dumb-bell similarly aligned with and overlapping said third dumb-bell and displaced with respect thereto the major axes of the third and fourth fields being substantially linear and parallel, said first region lobes and said second region lobes intersecting each other at an angle such that said courses are defined by the intersection of said lobes.

3. An arrangement for producing a radio beacon having a plurality of equal signal courses comprising a first pair of antennas having a predetermined spacing, a second pair of similarly spaced antennas located in the plane determined by a line passing through said first pair of antennas and spaced from said first pair, a third pair of antennas having a predetermined spacing located in a second plane at right angles to said first plane and midway between said first and second pairs of antennas, a fourth pair of antennas having the same spacing as said third pair located in said second plane and spaced from said third pair, said third and fourth pairs being located on opposite sides of said first plane and equi-distant therefrom, a source of radio frequency energy, a first modulator connected to the output of said source, means for connecting said first modulator to said first and second pairs of antennas, means for phasing the energy fed from said modulator to at least one of said pairs of antennas and means for adjusting the relative currents of said pairs, a second modulator connected to the output of said source, means for connecting said second modulator to said third and fourth pairs of antennas, means for phasing the energy fed from said second modulator to at least one of said last mentioned pairs of antennas, and means for adjusting the relative currents of said pairs.

4. An arrangement according to claim 3 wherein the antennas of each pair are similarly phased, said second and fourth pairs of antennas are phased 180° with respect to said first and third pairs of antennas, the spacing between the centers of the coplanar pairs is one-half wave length at the operating frequency, and the ratio of currents in each of the coplanar pairs of antennas is less than unity and greater than zero.

5. An arrangement for producing a radio beacon having a plurality of equal signal courses comprising a first antenna, four other antennas each equally spaced from said first antenna and from each other, means for connecting a modulator and a source of radio frequency energy to said first antenna and to two of said four antennas, each of said two being on opposite sides of said first antenna, means for connecting a second modulator and a source of radio frequency to said first antenna and to the remaining two of said four antennas, and means for phasing the currents in one antenna of each two and the first antenna 180° with respect to the currents in the remaining antennas of each two.

6. An arrangement according to claim 5 wherein the spacing of said four antennas from said first antenna is one-half wave length at the operating frequency and the intensity ratio of the phased currents is 10 to 6.

7. An arrangement according to claim 5 wherein the spacing of said four antennas from said first antenna is $5/9$ of a wave length at the operating frequency and the intensity ratio of the phased currents is 10 to 6.

8. The method of producing a radio beacon having a plurality of equi-signal courses formed by two intersecting regions of radio frequency energy, which comprises forming each of said regions from two radio frequency fields each produced by a pair of spaced radiators, adjusting the currents in each radiator of a pair to substantial equality, and adjusting the spacing between the radiators of each pair and the relative currents in the two pairs of radiators with respect to each other and with respect to the frequency of radiation so that the resultant energy at any point in each of said regions is given by the expression $$2n \cos\left(\frac{\pi D}{\lambda} \cos \theta\right)\sqrt{1+\left(\frac{m}{n}\right)^2+2\frac{m}{n}\cos \phi'}$$

wherein $m$ represents the current in one pair of radiators and $n$ represents the current in the other pair of radiators the ratio $m/n$ being less than unity and greater than zero, D represents the spacing between the radiators of said pair and is greater than zero, $\theta$ is any angle with respect to a line passing through said radiators, $\lambda$ represents the wave length at the operating frequency and $\varphi'$ represents the phase delay between the energies arriving at said point.

ARMIG G. KANDOIAN.